United States Patent
Yu et al.

(10) Patent No.: US 6,750,443 B2
(45) Date of Patent: Jun. 15, 2004

(54) VARIABLE OPTICAL ATTENUATOR HAVING A SPLITTER TO MONITOR LIGHT SIGNALS

(75) Inventors: Tai-Cheng Yu, Tu-Cheng (TW); Yao-Hao Chang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 196 days.

(21) Appl. No.: 10/036,274

(22) Filed: Dec. 24, 2001

(65) Prior Publication Data

US 2003/0071201 A1 Apr. 17, 2003

(30) Foreign Application Priority Data

Oct. 12, 2001 (TW) ............................. 90217380 U

(51) Int. Cl.$^7$ ................................................. G01J 1/04
(52) U.S. Cl. ................................ 250/227.11; 385/140
(58) Field of Search .................. 250/227.11; 385/140, 385/76–78, 31, 33

(56) References Cited

U.S. PATENT DOCUMENTS 6,130,984 A * 10/2000 Shen et al. ................. 385/140
6,603,596 B2 * 8/2003 Inagaki et al. .............. 359/341.4
6,603,906 B2 * 8/2003 Qin et al. .................... 385/48

* cited by examiner

*Primary Examiner*—Thanh X. Luu
(74) *Attorney, Agent, or Firm*—Wei Te Chung

(57) ABSTRACT

An optical attenuator (10) includes: an optical splitter (11), a collimator (12), two detectors (51, 52), a first and second reflectors (21, 22), an attenuating element (3) and a driving device (4). The optical splitter includes a ferrule (112) and a GRIN (graded index) lens (113). The collimator is similar to the optical splitter. Input optical signals are transmitted from an input fiber (110) through the optical splitter and are then directed to the first reflector. The optical signals reflected by the first reflector pass through the attenuating element and are subsequently reflected to the collimator by the second reflector. The two detectors receive sampling signals via an input and an output sampling fibers (111, 112). The driving device can drive the attenuating element in response to the attenuation ratio coming from the two detectors.

4 Claims, 2 Drawing Sheets

VARIABLE OPTICAL ATTENUATOR HAVING A SPLITTER TO MONITOR LIGHT SIGNALS

BACKGROUND OF THE INVENTION

1. Field of the Invention

The present invention relates to an optical attenuator, and particularly to a variable optical attenuator having an electrical controlling circuit.

2. Description of the Related Art

Optical attenuators are used to optimize the optical power of signals at key points in optical communications networks. For example, in networks having Erbium Doped Fiber Amplifiers (EDFAs), optical attenuators are used between stages of EDFAs to provide constant gain. In Wavelength Division Multiplexer (WDM) systems, optical attenuators are used to adjust optical power of "added" laser signals to match the signals strength of other channels within the network. Optical attenuators can also be used to set signal strength within the range of a particular receiver.

Known methods to obtain a variable optical attenuator include coating a filter element with an attenuation layer having a variable density, and bending optical fibers to get a given attenuation. A variable optical attenuator can also be obtained by changing a distance between a reflector and an input port or an output port.

U.S. Pat. No. 5,745,634 discloses a voltage controlled attenuator comprising a first lens for receiving incoming optical signals, a second lens for outputting the attenuated optical signals, an optical power detector and a controllable attenuating element. The optical power detector monitors the intensity of the attenuated optical signals, and the controllable attenuating element varies the attenuation of the outputting optical signals in response to electrical signals from the optical power detector. A weakness of this prior art arrangement is that the optical power detector is separate from the second lens. The attenuated optical signals reflected by an input face of the second lens have to travel a distance to the optical power detector, which wastes a portion of the reflected optical signals. An arrangement which utilizes the reflected signals more efficiently is desired.

BRIEF DESCRIPTION OF THE INVENTION

An object of the present invention is to provide an optical attenuator which controllably attenuates optical signals by using an electrical controlling circuit.

Another object of the present invention is to provide an optical attenuator which accurately and flexibly controls attenuation of optical signals by using an optical splitter and two sampling detectors.

An optical attenuator in accordance with the present invention comprises: an optical splitter, a collimator, an input and an output detectors, a first and a second reflectors, an attenuating element and a driving device. The splitter includes a ferrule and a GRIN (graded index) lens. Input optical signals are transmitted from an input fiber through the splitter and are then directed to the first reflector. The optical signals reflected by the first reflector pass through the attenuation element and subsequently are reflected to a collimator by the second reflector, and are then directed to an output fiber. The input and output detectors detect the intensity of input optical signals and output optical signals and a control circuitry calculates the attenuation ratio. The driving device then drives the attenuating element in response to the attenuation ratio.

DETAILED DESCRIPTION OF THE INVENTION

Figure 1:
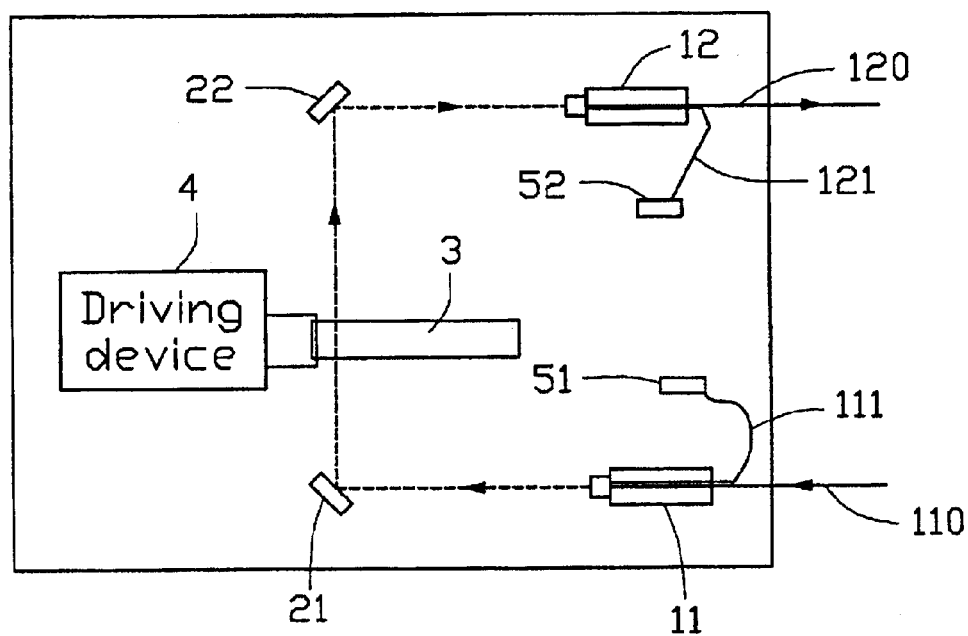
FIG. 1 is a schematic diagram of a variable optical attenuator according to the present invention.

As shown in FIG. 1, an optical attenuator 10 of the present invention comprises: an optical splitter (i.e., collimator) 11, a collimator 12, an input and an output detectors 51, 52, a first and a second reflectors 21, 22, an attenuating element 3 and a driving device 4. The optical attenuator 10 attenuates optical signals traveling along an optical path.

Figure 2:
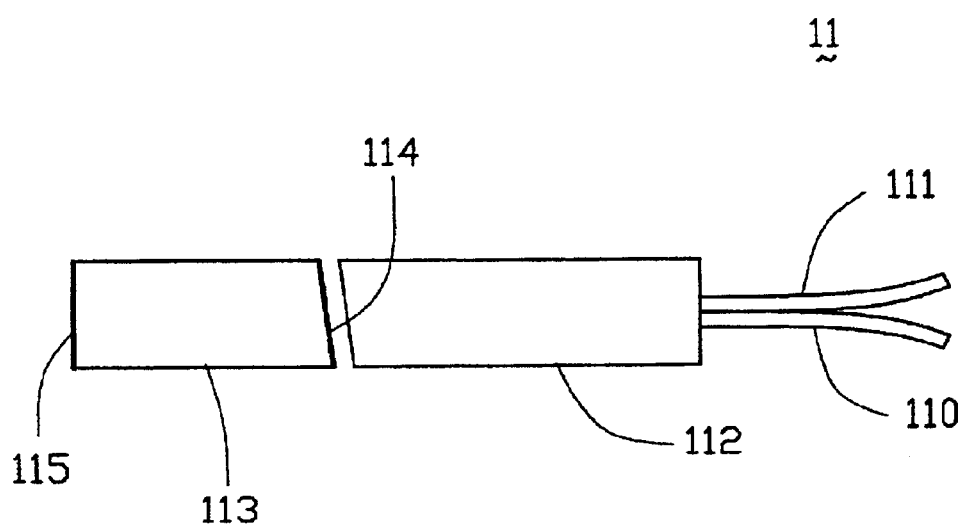
FIG. 2 is a schematic diagram view of a splitter of the variable optical attenuator according to the present invention.

Referring to FIG. 2, the optical splitter 11 includes a ferrule 112 and a GRIN (graded index) lens 113. The ferrule 112 is closely attached to the GRIN lens 113. One end of each of an input fiber 110 and an input sampling fiber 111 are retained in the ferrule 112. The GRIN lens 113 has a first surface 114 attached to the ferrule 112 and a second surface 115 opposite to the first surface 114. An antireflection film is coated on the first surface 114 and a beam splitter film is coated on the second surface 115. Little reflection of the optical signals will occur at the antireflection film, but a portion of the optical signals will be reflected at the beam splitter film.

The collimator 12 is similar to the optical splitter 11 and also comprises a ferrule (not labelled) and a GRIN (graded index) lens (not labelled). An output fiber 120 and an output sampling fiber 121 are retained in the ferrule of the collimator 12. However, both end surfaces of the collimator's GRIN lens are just coated with an antireflection film, and optical signals transmitted from the second reflector 22 to the collimator 12 are automatically split into two portions, respectively received by the output fiber 120 and the output sampling fiber 121.

The input and output detectors 51, 52 are respectively connected to the input sampling fiber 111 and the output sampling fiber 121 for detecting the intensity of optical signals transmitted through the sampling fibers 111, 112. The input and output detectors 51, 52 can be photodiodes.

The first and second reflectors 21, 22 are arranged at such an angle that the first reflector 21 ensures that most of the optical signals transmitted from the optical splitter 11 are directed to the attenuating element 3 and the second reflector 22 ensures that most of the attenuated optical signals transmitted from the attenuating element 3 are received by the collimator 12.

The attenuating element 3 is used for attenuating optical signals passing through it. A conventional variable neutral density filter or a conventional wedge shaped filter can be used here. The attenuating element 3 is attached to the driving device 4. A linear movement of the attenuating element 3 in a direction perpendicular to the path of optical signals passing through it can lead to a graduated change of attenuation of the signals. Furthermore, the driving device 4 can drive the attenuating element 3 in response to an attenuation ratio output from a control circuitry (not shown).

In use, input optical signals are transmitted through the input fiber 110 into the optical splitter 11, and then pass through the GRIN lens 113 to the first reflector 21. The beam splitter film coated on the second surface 115 of the GRIN lens 113 reflects a small part of the input optical signals back into the input sampling fiber 111. In this embodiment, 5 percent of the input optical signals are reflected and directed through the input sampling fiber 111 to the input detector 51. The other 95 percent of the input optical signals are transmitted through the optical splitter 11 and are reflected by the first reflector 21 to travel through the attenuating element 3. The attenuated optical signals from the attenuating element 3 are reflected by the second reflector 22 and are received in the collimator 12. About 5 percent of the attenuated optical signals are split and directed to the output detector 52 through the output sampling fiber 121. The remaining 95 percent if the attenuated optical signals are directed as output optical signals to the output fiber 120. After the intensities of the optical signals are detected by the input and output detectors 51, 52, a control circuitry (not shown) is used to calculate the intensity of the input optical signals and the output optical signals. The control circuitry also calculates an attenuation ratio from the signals received from the detectors 51,52, and the driving device 4 then drives the attenuating element 3 to move to an appropriate position to achieve a desired attenuation ratio.

The advantage of the system of the present invention is that it provides greater efficiency in controlling the desired attenuation of the signals. Instead of directly reflecting a beam of light to the detector as in the prior art, the present invention transports the small part of the input optical signals transmitted to the input detector 51 via a fiber optic link—the input sampling fiber 111. The optical signal sent to the input detector 51 therefore is more secure and efficient.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An optical attenuator for attenuating optical signals in an optical path, comprising:

an optical splitter for splitting input optical signals from an input fiber into a first portion and a second portion, the optical splitter comprising a ferrule and a graded index (GRIN) lens, the ferrule retaining an end of the input fiber and an end of a second fiber, said second fiber receiving the second portion of the input optical signals, and the second portion of the input optical signals being transmitted to a first detector;

an output port for splitting attenuated optical signals into two portions, one portion of the attenuated optical signals being transmitted to an output fiber and a second portion of the attenuated optical signals being transmitted to a second detector; and an attenuating element for attenuating the input optical signals, the attenuating element receiving the first portion of the input optical signals, the attenuating element being driven by a drive device in response to signals from the first detector and the second detector; wherein the first detector is positioned to receive said second portion of the input optical signals and the second detector is positioned to receive said second portion of the attenuated optical signals, and the GRIN lens has a first surface coated with an antireflection film and a second surface coated with a beam splitter film.

2. The optical attenuator as claimed in claim 1, wherein the output port is a collimator.

3. The optical attenuator as claimed in claim 1, wherein the first detector and the second detector respectively include a photodiode.

4. An optical attenuator comprising:

an input collimator including a first graded index (GRIN) lens and a first ferrule, main and sample input fibers retained in the first ferrule, a beam splitter film applied on said first GRIN lens;

an output collimator including a second GRIN lens and a second ferrule, main and sample output fibers retained in the second ferrule, a beam splitter film applied on said second GRIN lens;

an input detector connected to a distal end of said sample input fiber;

an output detector connected to a distal end of said sample output fiber; and an attenuation element interrupting a light path defined between said first GRIN lens and said second GRIN lens; wherein said attenuation element is controllable to move according to detection results from both said first and second detectors.

* * * * *